(12) United States Patent
Towal et al.

(10) Patent No.: US 10,268,188 B2
(45) Date of Patent: Apr. 23, 2019

(54) ACTIVE CAMERA MOVEMENT DETERMINATION FOR OBJECT POSITION AND EXTENT IN THREE-DIMENSIONAL SPACE

(71) Applicant: QUALCOMM Incorporated, San Diego, CA (US)

(72) Inventors: Regan Blythe Towal, La Jolla, CA (US); Shayegan Omidshafiei, Boston, MA (US); Aliakbar Aghamohammadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 15/069,834

(22) Filed: Mar. 14, 2016

(65) Prior Publication Data
US 2017/0160737 A1 Jun. 8, 2017

Related U.S. Application Data

(60) Provisional application No. 62/262,249, filed on Dec. 2, 2015.

(51) Int. Cl.
| | | |
|---|---|---|
| *G05D 1/00* | (2006.01) | |
| *H04N 5/232* | (2006.01) | |
| *G06K 9/00* | (2006.01) | |
| *B25J 9/16* | (2006.01) | |
| *G06T 7/564* | (2017.01) | |

(52) U.S. Cl.
CPC ......... *G05D 1/0011* (2013.01); *B25J 9/1697* (2013.01); *G05D 1/0094* (2013.01); *G06K 9/00664* (2013.01); *G06T 7/564* (2017.01); *H04N 5/23203* (2013.01); *G05B 2219/40617* (2013.01)

(58) Field of Classification Search
CPC ............ G05D 1/0011; G05D 9/00664; G05D 5/23203
USPC .......................................................... 348/114
See application file for complete search history.

(56) References Cited

U.S. PATENT DOCUMENTS

| | | |
|---|---|---|
| 5,831,621 A | 11/1998 | Pito |
| 7,760,932 B2 | 7/2010 | Lee et al. |

(Continued)

FOREIGN PATENT DOCUMENTS

| | | |
|---|---|---|
| EP | 2275993 A2 | 1/2011 |
| EP | 2058761 B1 | 12/2011 |

OTHER PUBLICATIONS

International Search Report and Written Opinion—PCT/US2016/060079—ISA/EPO—dated Feb. 23, 2017.

(Continued)

*Primary Examiner* — William C Vaughn, Jr.
*Assistant Examiner* — Jae N Noh
(74) *Attorney, Agent, or Firm* — Seyfarth Shaw LLP

(57) ABSTRACT

A method of motion planning includes observing an object from a first pose of an agent having a controllable camera. The method also includes determining one or more subsequent control inputs to move the agent and the camera to observe the object from at least one subsequent pose. The subsequent control input(s) are determined so as to minimize an expected enclosing measure of the object based on visual data collected from the camera. The method further includes controlling the agent and the camera based on the subsequent control input(s).

20 Claims, 7 Drawing Sheets

(56) References Cited

U.S. PATENT DOCUMENTS

| | | |
|---|---|---|
| 7,822,264 B2 | 10/2010 | Balslev et al. |
| 8,126,260 B2 | 2/2012 | Wallack et al. |
| 8,751,048 B2 | 6/2014 | Shimizu et al. |
| 2006/0017720 A1 | 1/2006 | Li |
| 2008/0181485 A1 | 7/2008 | Beis et al. |
| 2013/0250050 A1* | 9/2013 | Kanaujia ............... H04N 7/181 348/42 |
| 2013/0343640 A1* | 12/2013 | Buehler ............... B25J 9/0087 382/155 |
| 2016/0016311 A1* | 1/2016 | Konolige ............... B25J 5/007 700/245 |
| 2017/0003121 A1* | 1/2017 | Brandli ............... G01B 11/25 |

OTHER PUBLICATIONS

Agha-Mohammadi A., et al., "FIRM: Sampling-based feedback motion-planning under motion uncertainty and imperfect measurements," The International Journal of Robotics Research, Nov. 15, 2013, pp. 1-37.

Prentice S., et al., "The Belief Roadmap: Efficient Planning in Belief Space by Factoring the Covariance," The International Journal of Robotics Research 28.11-12, 2009, pp. 1448-1465.

* cited by examiner

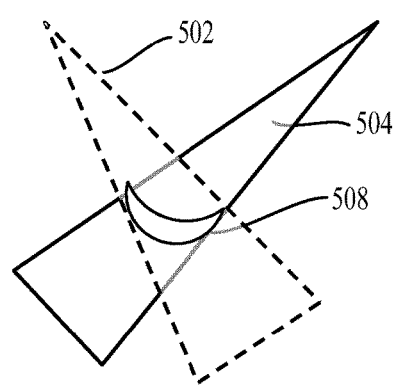
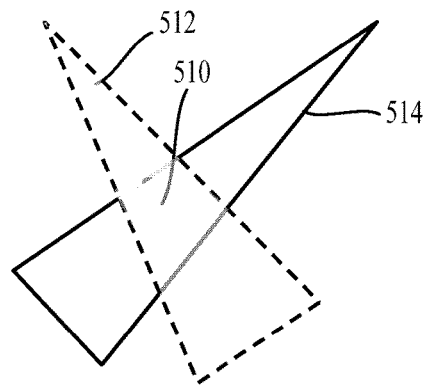
FIG. 5A    FIG. 5B

ACTIVE CAMERA MOVEMENT DETERMINATION FOR OBJECT POSITION AND EXTENT IN THREE-DIMENSIONAL SPACE

CROSS-REFERENCE TO RELATED APPLICATION

The present application claims the benefit of U.S. Provisional Patent Application No. 62/262,249, filed on Dec. 2, 2015, and titled "ACTIVE CAMERA MOVEMENT DETERMINATION FOR OBJECT POSITION AND EXTENT IN THREE-DIMENSIONAL SPACE," the disclosure of which is expressly incorporated by reference herein in its entirety.

BACKGROUND

Field

Certain aspects of the present disclosure generally relate to machine learning and, more particularly, to improving systems and methods of motion planning.

Background

Mobile agents (e.g., robots) are often faced with unidentified objects and obstacles while moving around an environment. When choosing actions to take in an environment, agents can choose actions that decrease their distance to a goal state, increase their information about the environment, and avoid obstacle collisions, or some combination thereof.

Gathering information about the environment is an important objective when attempting to take actions with limited resources or in unknown environments. One type of environmental information that can be useful in oft traversed domains is the shape and extent of objects in the domain. For the purposes of navigation, the rough extent of an object on the order of the size of the agent itself is useful. Information about the shape and extent of an object at this scale is often gathered through depth-based sensors such as structured light, laser and radar types of sensing technologies or through depth calculations made by co-registering features in many camera views (either from more than one camera or one camera at different points in time). However, most techniques for estimating the shape and extent of objects simply take advantage of movements by the agent, but do not prioritize movements that would be advantageous to the estimation of the shape and extent of an object.

SUMMARY

In an aspect of the present disclosure, a method of motion planning is presented. The method includes observing an object from a first pose of an agent having a controllable camera. The method also includes determining one or more subsequent control inputs to move the agent and the camera to observe the object from at least one subsequent pose. The subsequent control input(s) are determined such that an expected enclosing measure of the object based on visual data collected from the camera is minimized. The method further includes controlling the agent and the camera based on the subsequent control input(s).

In another aspect of the present disclosure, an apparatus for motion planning is presented. The apparatus includes a memory and at least one processor coupled to the memory. The one or more processors are configured to observe an object from a first pose of an agent having a controllable camera. The processor(s) is(are) also configured to determine one or more subsequent control inputs to move the agent and the camera to observe the object from one or more subsequent poses. The subsequent control input(s) is(are) determined such that an expected enclosing measure of the object based on visual data collected from the camera is minimized. The processor(s) is(are) further configured to control the agent and the camera based on the subsequent control input(s).

In yet another aspect of the present disclosure, an apparatus for motion planning is presented. The apparatus includes means for observing an object from a first pose of an agent having a controllable camera. The apparatus also includes means for determining one or more subsequent control inputs to move the agent and the camera to observe the object from one or more subsequent poses. The subsequent control input(s) is(are) determined such that an expected enclosing measure of the object based on visual data collected from the camera is minimized. The apparatus further includes means for controlling the agent and the camera based on the subsequent control input(s).

In still another aspect of the present disclosure, a non-transitory computer readable medium is presented. The non-transitory computer readable medium has encoded thereon program code for motion planning. The program code is executed by a processor and includes program code to observe an object from a first pose of an agent having a controllable camera. The program code also includes program code to determine one or more subsequent control inputs to move the agent and the camera to observe the object from one or more subsequent poses. The subsequent control input(s) is(are) determined such that an expected enclosing measure of the object based on visual data collected from the camera is minimized. The program code further includes program code to control the agent and the camera based on the subsequent control input(s).

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 5A-B are diagrams illustrating an exemplary joint visual hull in accordance with aspects of the present disclosure.

DETAILED DESCRIPTION

Figure 1:
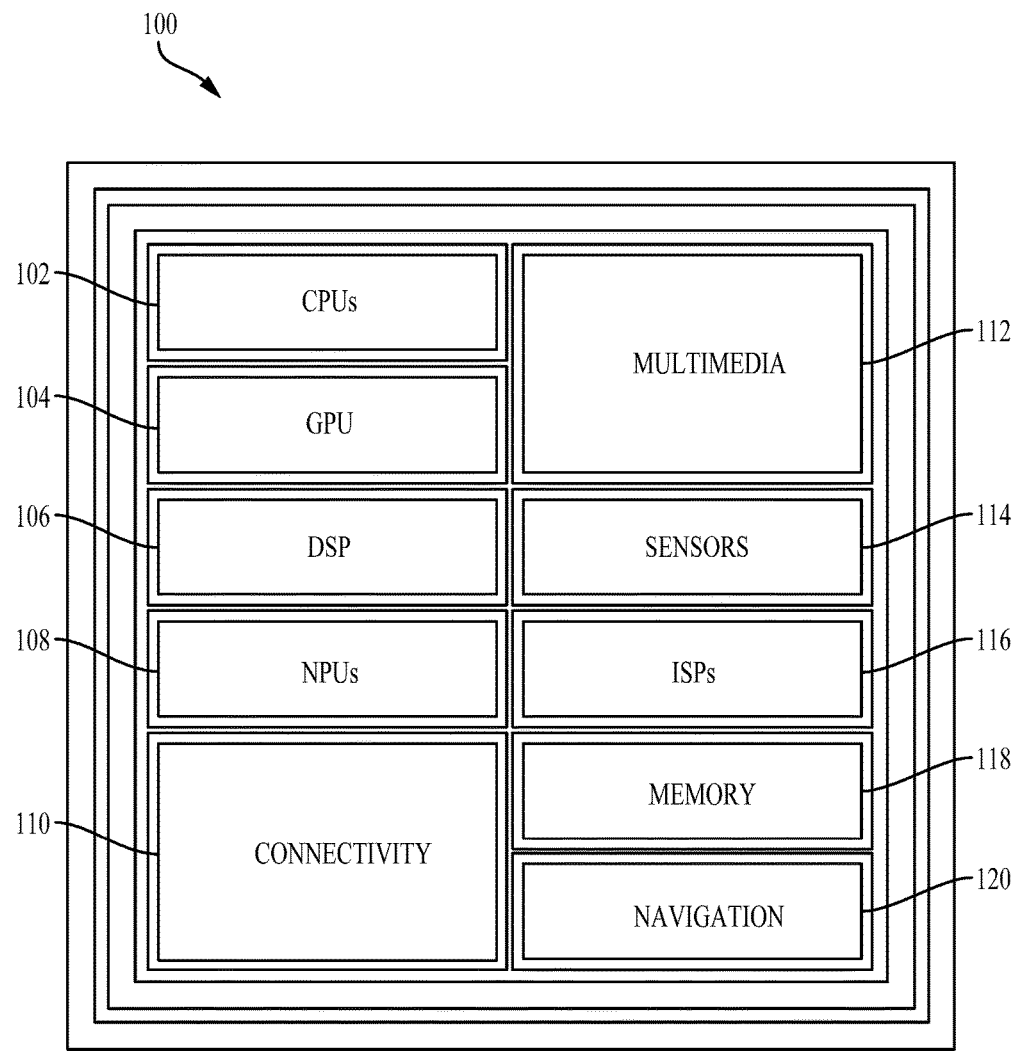
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure are directed to motion planning and, more particularly, to improved efficiency in selection of movements in a sequence of movements by an agent (e.g., a robot, a drone, or a motor vehicle) equipped with a single camera. One issue addressed in the present disclosure is how to choose movements of the agent to best estimate the shape and extent of an object or obstacle in an unknown environment. For example, if a drone is deployed and observes an object in a scene, a control input may be determined so as to move the drone to determine the shape and extent of the object using visual sensors (e.g., a single camera) rather than depth sensors. In doing so, estimation of the object shape and extent may be performed faster and/or more accurately than conventional methods (e.g., employing random or unrelated movements).

In accordance with aspects of the present disclosure, a current location of the agent and a visual camera view of the environment may be provided as inputs. In turn, systems and methods of the present disclosure may output an action command. The action command may be in the form of velocity commands to a set of actuators or a preprogrammed motion primitive that specifies a trajectory through space over a finite time window, for example.

In some aspects, a camera frame may be processed to determine one or more bounding boxes around likely objects in an environment. Because the distance to the object may be unknown, each bounding box (e.g., a two-dimensional bounding box) may define a rectangular pyramid whose tip is centered at the camera's focal point and extends through the rectangle at the image plane. The base of the pyramid may be constrained to exist some distance away from the camera image plane. The distance may, in some aspects, be set based on the known resolution of the camera or scale of the environment. For example, a mobile device camera (e.g., cell phone camera) operating indoors may have a smaller maximum extent of the pyramid than a professional single-lens reflex (SLR) camera operating outdoors. As such, a rectangular pyramid for the mobile device camera may comprise an estimate of the object's shape and extent based on a single frame.

A movement may then be selected based on this current estimate of the object shape and extent. The agent (e.g., robot) may take the selected movement. A second camera frame may be processed to determine additional bounding boxes around the likely objects, and a new estimate for each object's shape and location may be determined. This second frame also produces a rectangular pyramid, however, because there are two pyramid estimates, confidence that the object lies within the intersection of these two rectangular pyramids, which is a smaller area than the initial estimate, may be increased.

This process may be repeated over time as actions are taken. In this way, new estimates of the object's location may be generated and the shape and extent of the object can be determined. In one exemplary aspect, the next action may be chosen such that the expected intersection area after the next camera measurement is minimized, subject to the constraint that the entire bounding box remains visible in the camera view. Accordingly, movements may be selected that would be more likely to reduce (or even minimize) the intersection area over time compared with an arbitrary set of movements.

FIG. 1 illustrates an example implementation of the aforementioned motion planning using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include a fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for observing an object from a first pose of an agent having a controllable camera. The instructions loaded into the general-purpose processor 102 may also comprise code for determining at least one subsequent control input to move the agent and the camera to observe the object from a subsequent pose, to reduce an expected enclosing measure of an object based on visual data collected from the camera. The instructions loaded into the general-purpose processor 102 may also comprise code for controlling the agent and the camera based on the subsequent control input.

Figure 2:
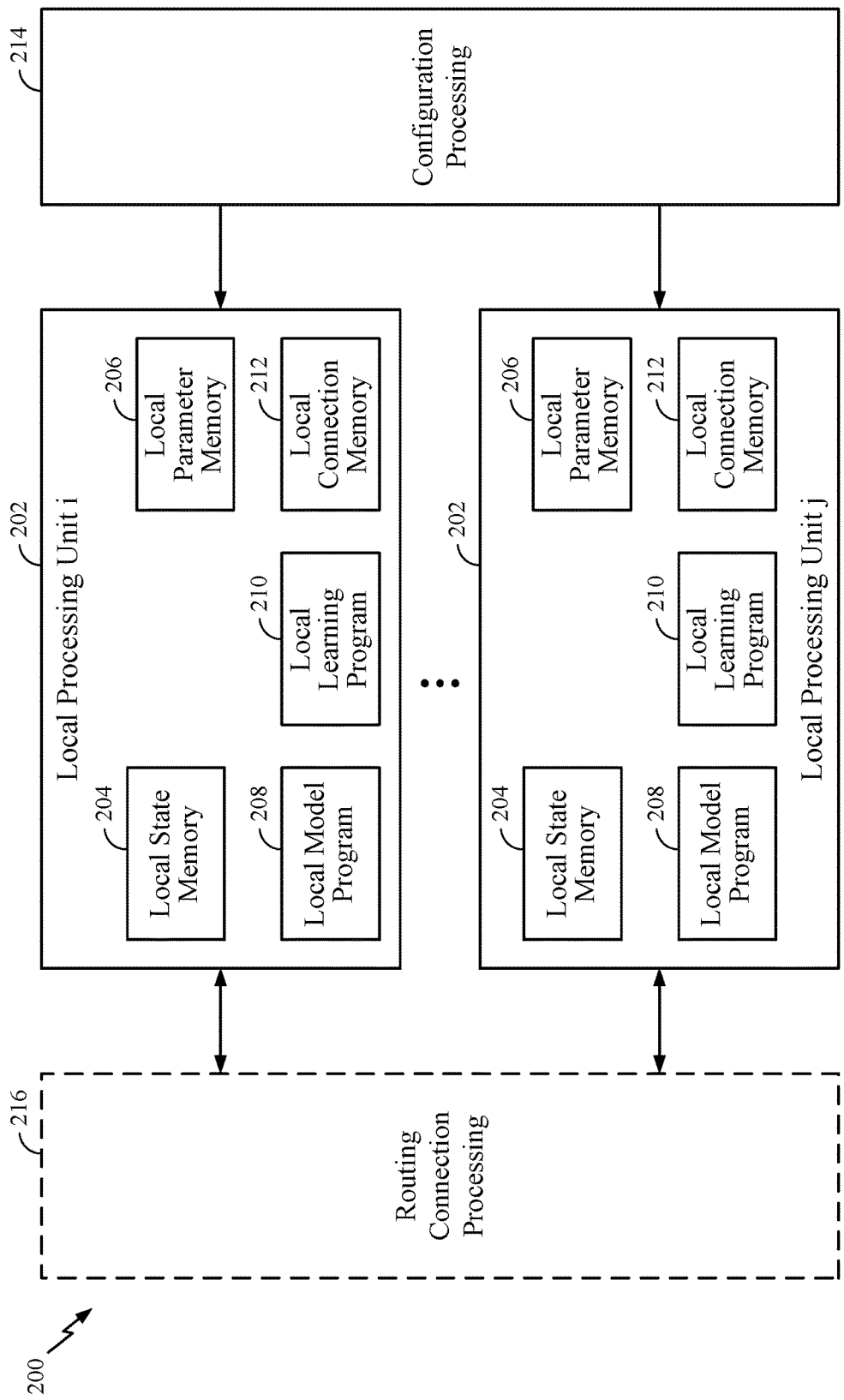
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

In one configuration, a machine learning model is configured for observing an object from a first pose of an agent having a controllable camera. The model is also configured for determining a subsequent control input to move the agent and the camera to observe the object from a subsequent pose, to minimize an expected enclosing measure of an object based on visual data collected from the camera. The model is further configured for controlling the agent and the camera based on the subsequent control input(s). The model includes observing means, determining means, and/or controlling means. In one aspect, the observing means, determining means, and/or controlling means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Figure 3:
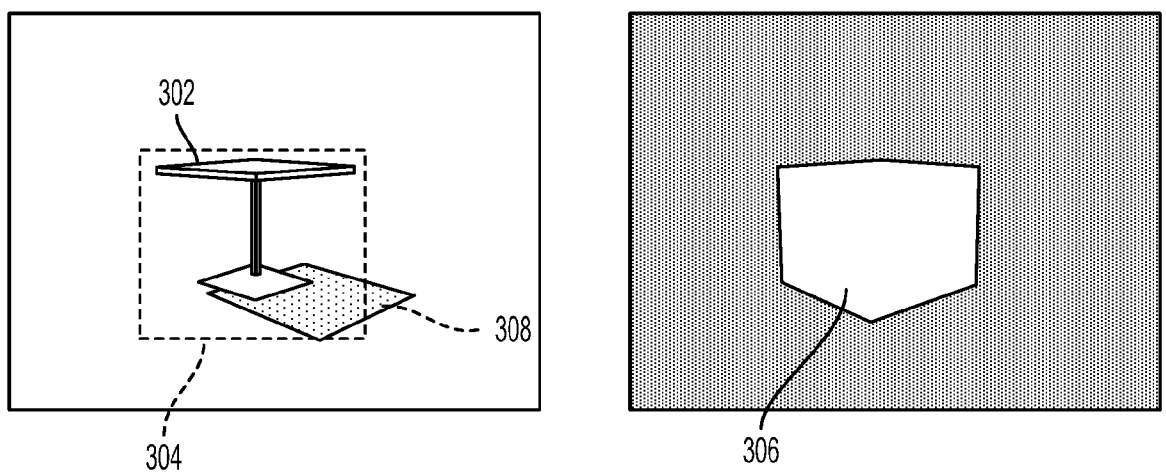
FIG. 3 illustrates an exemplary technique for estimating the shape of an object in accordance with aspects of the present disclosure.

FIG. 3 is a diagram illustrating an exemplary technique for estimating the shape of an object. Referring to FIG. 3, a single object (e.g., table 302 shown with shadow 308) is shown in an image (e.g., a red, green, blue (RGB) image). Of course, this is merely exemplary for ease of illustration and understanding, and additional objects may be included in the image. Using an object localization process, a two-dimensional (2D) silhouette of the object or bounding box 304 may be generated. A color or greyscale solution can be used for bounding box detection. The 2D silhouette 306 may be represented by $s_k(x_i,y_i) \in B$, where $B=\{0,1\}$ is the binary space. For example, if $s_k(x_i,y_i)=1$, the object is visible in pixel $(x_i,y_i)$ of image $I_k$. Otherwise, the object is not visible in pixel $(x_i,y_i)$. One goal is to determine the 3D silhouette of the object or silhouette image 306 (e.g., three-dimensional bounding box) using the 2D image.

Given a sequence of RGB images $I_{0:t}=\{I_0, \ldots, I_t\}$ and associated camera poses $p_{0:t}=\{p_0, \ldots, p_t\}$, a sequence of object silhouettes $s_{0:t}=\{s_0, \ldots, s_t\}$ can be calculated.

At each time step k, camera intrinsics M, camera pose $p_k$, and silhouette image $s_k$ can be used to calculate an inverse-projective cone $C_k(x_w,y_w,z_w) \in B$ or the visual hull of the object. In one example, $(x_i,y_i)$ may be the projection of point $(x_w,y_w,z_w)$ onto the camera image frame at the current timestep. In that case, $C_k(x_w,y_w,z_w) = s_k(x_i,y_i)$. In other words, if $C_k(x_w,y_w,z_w)=1$, then silhouette $s_k$ has indicated that the 3D object could potentially contain point $(x_w,y_w,z_w)$. Otherwise, the object certainly does not contain point $(x_w,y_w,z_w)$. Accordingly, the visual hull measurement model may be expressed as $C_k=h(p_k,s_k,M)$.

The camera may take multiple snapshots or photographs of an object from multiple different poses $p_{0:t}$ obtaining corresponding silhouettes $s_{0:t}$. The camera intrinsics M, silhouettes and/or camera poses may in turn be used to calculate corresponding visual hulls $C_{0:t}$ at each time step. A joint visual hull $V_t$ may then be calculated as the intersection of the visual hulls given by:

$$V_t = \cap_k^{t=0} C_k \tag{1}$$

The joint visual hull provides an approximation of the shape and location in 3D space.

In some aspects, the visual hulls may be used to determine a subsequent control input for moving the camera such that a measure m on the joint visual hull for the object may be reduced or minimized. The subsequent control input to produce this so-called active shape-from-silhouette (ASfS) reconstruction may be given by:

$$u_{t+1}^* = \underset{u \in U}{\arg\min}\, m\left(\bigcap_{k=0}^{t+1} C_k\right) \tag{2}$$

s.t.

$C_k = h(p_k, s_k M)$
$p_{k+1} = f(p_k, u_k)$
$s_k \neq 0 \forall k,$ where u is the control input for movement of the camera and/or agent from a set of possible movements U, and h and f are functions of the camera dynamics and observation models. The control input u can be a vector including direction and speed. The variable $C_k$ is the cone or visual hull, $p_k$ is the pose (e.g., position and/or orientation of the camera in 3D space), $s_k$ is the silhouette (or 2D bounding box), k is the time step or number of cones). The variable t is time, and M is the camera properties (e.g., type of lens). The variable m is the measure (e.g., volume) being reduced. The measure m can also be a surface area, height, or width, for example, if moving in a single direction and the goal is to avoid the object.

Using a minimized measure (e.g., volume) of the joint visual hull, a subsequent control input may be determined to move the agent and/or camera to a subsequent position from which to observe the object. A new joint visual hull may be determined using the visual data at the subsequent position. The new joint visual hull may similarly be minimized to determine a subsequent control input. In this way, the shape and extent of an object may be efficiently determined. In one configuration, the information is stored, creating a map for later re-use.

The subsequent control input defined in Equation 2 may be determined using batch processing or in a streaming or sequential manner. In one example, when batch processing is employed, all of the control inputs $u_{0:t}$ may be determined offline. In another example, when the subsequent control input is determined in a streaming or sequential manner, the subsequent control input $u_{t+1}$ may be determined incrementally online, given the history of inputs $u_{0:t}$ and the observed visual hulls $C_{0:t}$.

Figure 4A:
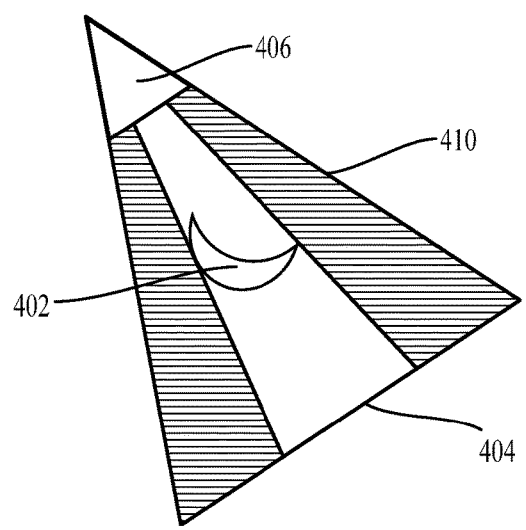
FIGS. 4A-B are diagrams illustrating an exemplary visual hull in accordance with aspects of the present disclosure.
Figure 4B:
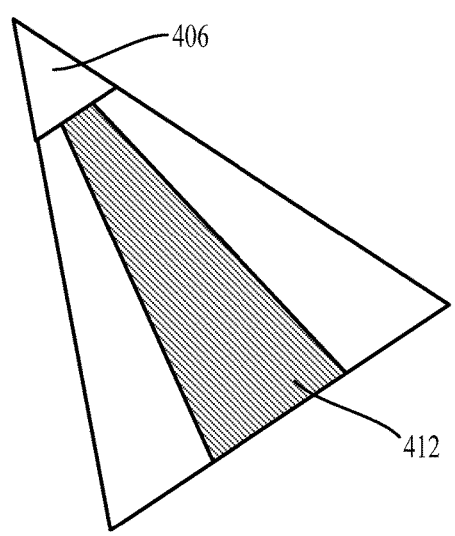

FIGS. 4A-4B are diagrams illustrating a visual hull projection from an image plane according to a camera 406 with a pose. Referring to FIG. 4A, a crescent shaped object 402 is observed within the field of view 410 of a camera 406 with pose $p_k$ in a real world environment. The pose $p_k$ of the camera 406 produces a projection of the crescent shaped object's image plane silhouette 404. FIG. 4B shows a visual hull 412 of the object 402. In some aspects, the visual hull 412 indicates the potential location of the object. The visual hull 412 may be determined based on camera intrinsics (e.g., a type of camera lens (e.g., fish eye lens)), the pose (e.g., position and/or orientation) of the camera 406 and/or the object's silhouette 404. The visual hull is in 3D, whereas the silhouette is in 2D.

FIGS. 5A-5B illustrate an exemplary joint visual hull in accordance with aspects of the present disclosure. As shown in FIG. 5A, a crescent shaped object 508 is observed in a first view of a camera (e.g., camera 406) at a first pose producing an object silhouette 502. The crescent shaped object is also observed in a second view of the camera at second pose producing a second object silhouette 504. The object silhouettes 502 and 504, camera intrinsics and/or corresponding camera poses may be used to respectively determine visual hulls 512 and 514, as shown in FIG. 5B.

In FIG. 5B, a joint visual hull 510 is determined as the intersection of the visual hulls 512 and 514. The joint visual hull 510 provides an approximation of the object shape and location in 3D space using the 2D images produced by the camera. Furthermore, in accordance with aspects of the present disclosure, visual hulls 512 and 514 may be used to determine a subsequent control input to move the camera (and/or agent) to a position to capture an image of the object such that a measure m on the joint visual hull 510 may be minimized.

Figure 6:
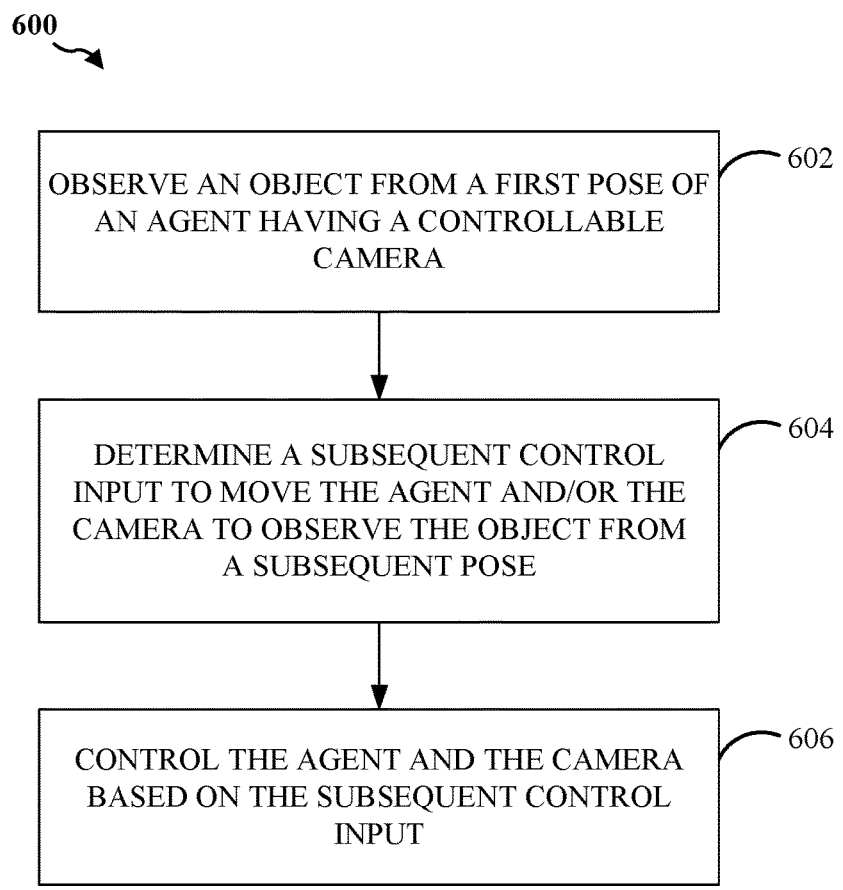
FIGS. 6-7 illustrate methods for motion planning in accordance with aspects of the present disclosure.

FIG. 6 illustrates a method 600 for motion planning in accordance with aspects of the present disclosure. In block 602, the process observes an object from a first pose of an agent having a controllable camera.

In block 604, the process determines a subsequent control input to move the agent and/or the camera to observe the object from a subsequent pose, to reduce or even minimize an expected enclosing measure (e.g., volume) of an object (e.g., visual hull) based on visual data collected from the camera. In some aspects, the subsequent control input may be determined sequentially or using sequential processing (e.g., processing one control input at a time) or by using batch processing of potential subsequent control inputs. The batch processing may use techniques such as receding horizon control (e.g., forecast 10 steps into future, and then perform the next analysis) or other analysis techniques. In addition, the subsequent control input may be determined to minimize or reduce a cost to minimize the expected enclosing volume (e.g., joint visual hull). In some aspects, the cost may comprise effort, time, work, and/or energy expended in moving the agent or camera to determine the shape and extent of the object.

Furthermore, in block 606, the process controls the agent and the camera based on the subsequent control input. In some aspects, the agent and the camera may be controlled to move about the object using a minimum number of control inputs.

Figure 7:
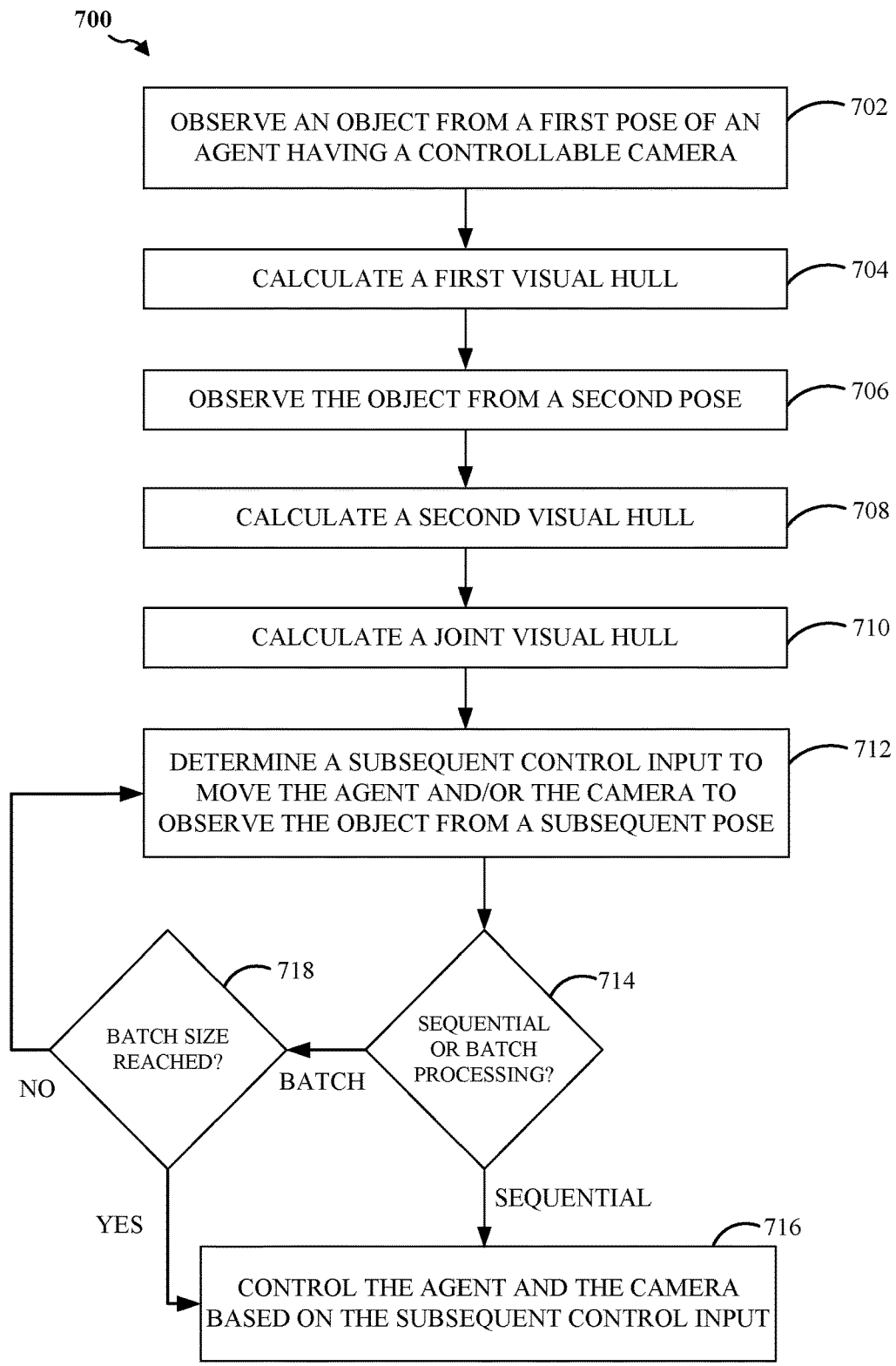

FIG. 7 is a block diagram illustrating a method 700 of motion planning in accordance with aspects of the present disclosure. In block 702, the process observes an object from a first pose of an agent having a controllable camera to produce a first 2D object silhouette or silhouette image. In block 704, the process calculates a first visual hull. The first visual hull may be calculated based on camera intrinsics such as the camera lens type, the pose of the camera, the first object silhouette or a combination thereof. The first visual hull is three-dimensional and may comprise a volume in which the object may be located.

In block 706, the object may be observed from a second pose of the agent or camera. In some aspects, the second pose may be randomly selected. A second 2D object silhouette is produced. In block 708, the process calculates a second visual hull. Similar to the first visual hull, the second visual hull may be calculated based on the camera intrinsics, the second object silhouette or a combination thereof.

In block 710, the process computes a joint visual hull based on the first visual hull and the second visual hull. The joint visual hull may be computed as the intersection of the first visual hull and the second visual hull. As such, the joint visual hull may provide greater confidence that the object is located within the space defined by the intersection. Furthermore, the joint visual hull may also provide an approximation of the object shape in a 3D space.

In block 712, the process determines a subsequent control input to move the agent and/or camera to a next pose so as to minimize the joint visual hull. That is, rather than moving based on a control input determined based on a random selection process or based on an incremental step process, the subsequent control input may be selected so as to minimize the joint visual hull and thereby more efficiently determine the shape and extent of the object of interest.

In block 714, the process evaluates the type of processing for determining the control input. If the type of processing is sequential processing, in block 714, the process controls the agent and or camera to move based on the determined subsequent control input, in block 716.

On the other hand, if batch processing is indicated, in block 718, the process evaluates whether the desired batch size has been reached. The batch size may be arbitrarily determined according to design preference. If the desired batch size (e.g., 10 subsequent control inputs) has not been reached, the process returns to block 712 to determine a next subsequent control input. In this scenario, the camera is not actually moved to the next location at the next time step. Rather, in some aspects, a projected visual hull of the object is determined for the next pose of the camera and used to determine the next subsequent control input.

If the desired batch size has been reached, in block 718, the process controls the agent and or camera to move based on the determined subsequent control input, in block 716. In this scenario, the agent is moved based on the last determined control input in the batch.

In some aspects, methods 600 and 700 may be performed by the SOC 100 (FIG. 1) or the system 200 (FIG. 2). That is, each of the elements of methods 600 and 700 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of motion planning for a robotic device comprising a camera, comprising:
    observing an object from a plurality of different poses with the camera of the robotic device;
    determining an expected volume of the object based on an intersection of a plurality of three-dimensional (3D) hulls determined from visible pixels of the object observed at the plurality of different poses;
    predicting, for each potential subsequent pose determined based on a potential control input of a plurality of potential control inputs, a subsequent 3D hull based on visible pixels of the object estimated to be observed at the potential subsequent pose, each potential subsequent pose determined while maintaining a current pose of the robotic device;
    determining a control input to move the robotic device to observe the object from a subsequent pose, the control input corresponding to the subsequent 3D hull with a smallest estimated intersection with the plurality of 3D hulls, such that the expected volume of the object is minimized based on visual data collected from the camera at the subsequent pose; and
    controlling the robotic device to move to a location corresponding to the subsequent pose based on the control input.

2. The method of claim 1, in which the determining the control input is based on minimizing a cost to minimize the expected volume.

3. The method of claim 1, in which the control input is determined using batch processing of the plurality of potential control inputs.

4. The method of claim 1, in which the control input is determined sequentially.

5. The method of claim 1, in which the robotic device is further controlled to move about the object using a minimum number of control inputs.

6. An apparatus for motion planning for a robotic device comprising a camera, comprising:
- a memory; and
- at least one processor coupled to the memory, the at least one processor configured:
  - to observe an object from a plurality of different poses with the camera of the robotic device;
  - to determine an expected volume of the object based on an intersection of a plurality of three-dimensional (3D) hulls determined from visible pixels of the object observed at the plurality of different poses;
  - to predict, for each potential subsequent pose determined based on a potential control input of a plurality of potential control inputs, a subsequent 3D hull based on visible pixels of the object estimated to be observed at the potential subsequent pose, each potential subsequent pose determined while maintaining a current pose of the robotic device;
  - to determine a control input to move the robotic device to observe the object from a subsequent pose, the control input corresponding to the subsequent 3D hull with a smallest estimated intersection with the plurality of 3D hulls, such that the expected volume of the object is minimized based on visual data collected from the camera at the subsequent pose; and
  - to control the robotic device to move to a location corresponding to the subsequent pose based on the control input.

7. The apparatus of claim 6, in which the at least one processor is further configured to determine the control input based on minimizing a cost to minimize the expected volume.

8. The apparatus of claim 6, in which the at least one processor is further configured to determine the control input using batch processing of a plurality of potential control inputs.

9. The apparatus of claim 6, in which the at least one processor is further configured to determine the control input using sequential processing.

10. The apparatus of claim 6, in which the at least one processor is further configured to control the robotic device to move about the object using a minimum number of control inputs.

11. An apparatus for motion planning for a robotic device comprising a camera, the apparatus comprising:
- means for observing an object from a plurality of different poses with the camera of the robotic device;
- means for determining an expected volume of the object based on an intersection of a plurality of three-dimensional (3D) hulls determined from visible pixels of the object observed at the plurality of different poses;
- means for predicting, for each potential subsequent pose determined based on a potential control input of a plurality of potential control inputs, a subsequent 3D hull based on visible pixels of the object estimated to be observed at the potential subsequent pose, each potential subsequent pose determined while maintaining a current pose of the robotic device;
- means for determining a control input to move the robotic device to observe the object from a subsequent pose, the control input corresponding to the subsequent 3D hull with a smallest estimated intersection with the plurality of 3D hulls, such that the expected volume of the object is minimized based on visual data collected from the camera at the subsequent pose; and
- means for controlling the robotic device to move to a location corresponding to the subsequent pose based on the control input.

12. The apparatus of claim 11, in which the means for determining comprises means for determining the control input based on minimizing a cost to minimize the expected volume.

13. The apparatus of claim 11, in which the means for determining comprises means for determining the control input using batch processing of the plurality of potential control inputs.

14. The apparatus of claim 11, in which the means for determining comprises means for determining the control input using sequential processing.

15. The apparatus of claim 11, in which the means for controlling comprises means for controlling the robotic device to move about the object using a minimum number of control inputs.

16. A non-transitory computer readable medium having encoded thereon program code for motion planning for a robotic device comprising a camera, the program code being executed by a processor and comprising:
- program code to observe an object from a plurality of different poses with the camera of the robotic device;
- program code to determine an expected volume of the object based on an intersection of a plurality of three-dimensional (3D) hulls determined from visible pixels of the object observed at the plurality of different poses;
- program code to predict, for each potential subsequent pose determined based on a potential control input of a plurality of potential control inputs, a subsequent 3D hull based on visible pixels of the object estimated to be observed at the potential subsequent pose, each potential subsequent pose determined while maintaining a current pose of the robotic device;
- program code to determine a control input to move the robotic device to observe the object from a subsequent pose, the control input corresponding to the subsequent 3D hull with a smallest estimated intersection with the plurality of 3D hulls, such that the expected volume of the object is minimized based on visual data collected from the camera at the subsequent pose; and
- program code to control the robotic device to move to a location corresponding to the subsequent pose based on the control input.

17. The non-transitory computer readable medium of claim 16, in which the program code to determine further comprises program code to determine the control input based on minimizing a cost to minimize the expected volume.

18. The non-transitory computer readable medium of claim 16, in which the program code to determine further comprises program code to determine the control input using batch processing of the plurality of potential control inputs.

19. The non-transitory computer readable medium of claim 16, in which the program code to determine further comprises program code to determine the control input using sequential processing.

20. The non-transitory computer readable medium of claim 16, in which the program code to control further comprises program code to control the robotic device to move about the object using a minimum number of control inputs.

* * * * *